United States Patent [19]
Kull et al.

[11] Patent Number: 5,740,547
[45] Date of Patent: Apr. 14, 1998

[54] RAIL NAVIGATION SYSTEM

[75] Inventors: Robert C. Kull, Olney, Md.; Roger P. Woodward, San Francisco, Calif.

[73] Assignee: Westinghouse Air Brake Company, Wilmerding, Pa.

[21] Appl. No.: 604,032

[22] Filed: Feb. 20, 1996

[51] Int. Cl.$^6$ .................. B61L 25/02; G06F 17/00
[52] U.S. Cl. .................. 701/19; 701/208; 701/213; 701/216; 246/122 R
[58] Field of Search .................. 364/424.024, 449.1, 364/449.7, 449.2, 449.95, 450, 436; 342/357, 457; 340/995, 990; 246/122 R, 167 R

[56] References Cited

U.S. PATENT DOCUMENTS

| | | | |
|---|---|---|---|
| 4,638,438 | 1/1987 | Endo et al. | 364/449.6 |
| 4,807,127 | 2/1989 | Tenmoku et al. | 364/449.1 |
| 4,863,123 | 9/1989 | Bernard et al. | 246/122 R |
| 5,129,605 | 7/1992 | Burns et al. | 246/5 |
| 5,332,180 | 7/1994 | Peterson et al. | 342/456 |
| 5,364,047 | 11/1994 | Petit et al. | 246/182 R |
| 5,374,933 | 12/1994 | Kao | 364/449.2 |
| 5,394,333 | 2/1995 | Kao | 340/990 |
| 5,437,422 | 8/1995 | Newman | 246/5 |
| 5,590,856 | 1/1997 | Quinn et al. | 246/219 |

*Primary Examiner*—Tan Q. Nguyen
*Attorney, Agent, or Firm*—James Ray & Associates

[57] ABSTRACT

Method and apparatus for a railway navigation system which provides information defining the position of a railway vehicle on a track system. The system uses an on-board computer with a track database representing the locations of the rail lines, including locations of curves and switches. The system uses a turn rate indicator and a speedometer means to obtain a value for the curvature of the track on which the railway vehicle moves. Curvature data so obtained is compared with data in the track database to determine the position of the railway vehicle in relation to curves and switches of the track system.

22 Claims, 1 Drawing Sheet

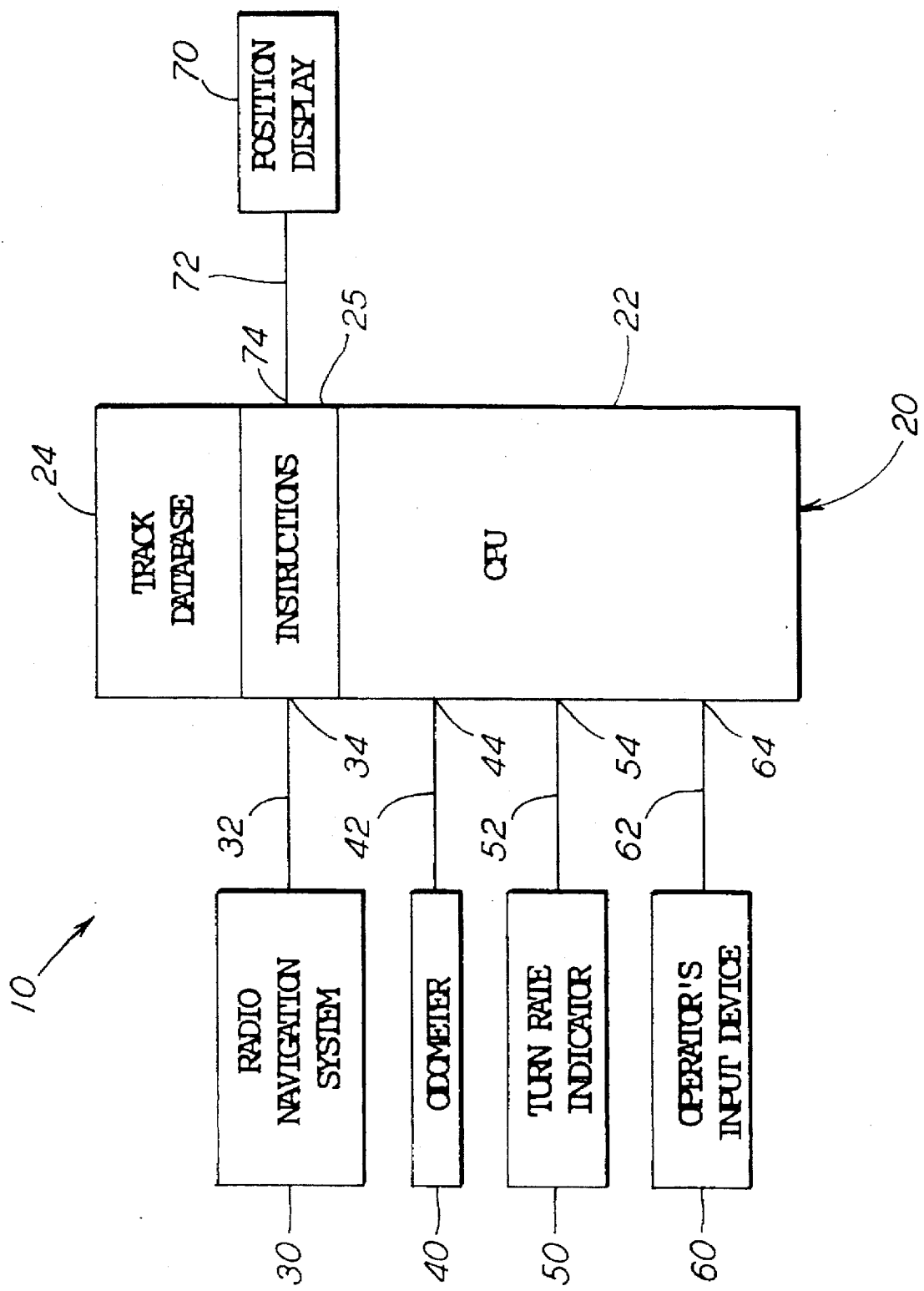

RAIL NAVIGATION SYSTEM

CROSS-REFERENCE TO RELATED APPLICATIONS

The invention taught in this application is related to the following co-pending patent application: TRAIN BRAKE PERFORMANCE MONITOR. The referenced patent application was filed on 08/601,688, and has been assigned to the assignee of the present invention. The teachings of the referenced patent application are incorporated herein by reference thereto.

FIELD OF THE INVENTION

The instant invention relates, in general, to railroad navigation systems and, more particularly, the instant invention relates to a railroad navigation system which uses a radio navigation system, a heading indicator or turn rate indicator and an odometer, to provide a track identifier and location on the track.

BACKGROUND OF THE INVENTION

Prior to the present invention, as is generally well known within the rail industry, train location systems possessing the capability to determine track ID's have always required some form of ground infrastructure. This has normally been accomplished through the use of track circuits and/or track transponders.

Experiments have been performed with a global positioning system (GPS) as the sole means of location. In such experiments it was determined that the GPS system requires such a high level of accuracy that it is necessary to make periodic corrections to the position obtained by the GPS system. These corrections were obtained in these systems from a ground station which transmits correction signals to a receiver on the train.

It is equally well known that some navigation systems have been developed, prior to the instant invention, for roadway type vehicles which use a GPS system for determining the approximate location of the vehicle in relation to a street database. By relating the approximate location of the vehicle with information concerning its direction of travel, it is sometimes possible to locate the vehicle on the database. It has not been possible, in such systems, to determine on which of a set of parallel and adjacent lanes the vehicle is travelling.

SUMMARY OF THE INVENTION

In a first aspect, the instant invention provides a navigation system for a railway vehicle travelling on a track system. The system uses an on-board computer with a track database representing the locations of rail lines, including locations of curves and switches. The system has a speed measuring means which may be an odometer with means to provide a speed signal by differentiation in time. The system uses a turn rate indicator and the speed measuring means to obtain a value for the curvature of the track on which the railway vehicle moves. This data is compared with data in the track database to determine the position of the vehicle in relation to curves and switches disposed in the track system. This position may be used for at least one of a display to an operator of the railway vehicle, as an input to a predetermined control means for the railway vehicle, or as a signal for computations in the computer system.

In a second aspect, this invention provides a navigation system for a railway vehicle travelling on a track system. In this embodiment, the system uses a GPS receiver to generate a signal indicating a position of the vehicle which may be an approximate position. The system also uses an odometer to generate another signal indicating position, and a signal indicating speed, and a turn indicator to generate a signal indicating position in relation to turns and/or switches disposed in the track system. The system has an onboard computer system which includes a database for the track system disposed therein. The on board computer combines the information from the GPS receiver, the odometer and the turn indicator or heading indicator to generate a signal indicating the position of the vehicle. This final position may be more accurate than the position obtained from the GPS receiver, and a value for this position can be obtained for points on the track system which are remote from turns and switches.

In an additional aspect, this invention provides a method of determining a track identifier for a railway vehicle moving on a track in a track system. A computer system is provided on the railway vehicle and this computer system is provided with a database having information defining locations and orientations of curves and switches as well as other track identifiers for the track system. The method includes the steps of providing the computer system with a signal indicative of an approximate position for the railway vehicle, and a signal indicating a time changing heading of the railway vehicle. A signal indicating an odometer reading is also provided to the computer system. The computer system uses the information cited above to generate a signal indicating a particular switch of the track system, and changes of track identification resulting from movement over the switch.

OBJECTS OF THE INVENTION

It is, therefore, one of the primary objects of the present invention to provide a method and an apparatus for a railway navigation system which can provide track I.D.'s and location of a train consist travelling on a track system without requiring the use of ground infrastructure, such as track circuits and/or transponders.

Another object of the present invention is to provide a method and an apparatus for a railway navigation system which can provide track I.D.'s and location of a train consist on the track system without requiring the extreme positioning accuracy of a global positioning system combined with a plurality of ground stations which send correction signals to the navigation system disposed on the train.

Still another object of the present invention is to provide a method and an apparatus for a railway navigation system which will exhibit sufficient accuracy to determine which of a set of parallel and adjacent tracks the train consist is moving on.

Yet another object of the present invention is to provide an apparatus for a railway navigation system which is relatively simple to maintain.

A further object of the present invention is to provide a method and an apparatus for a railway navigation system which is easy to install.

In addition to the objects and advantages of the present invention which have been generally described above, there will be various other objects and advantages of the invention that will become more readily apparent to those persons who are skilled in the railway navigation art from the following more detailed description of the invention, particularly, when the detailed description is taken in conjunction with the attached drawing figure and with the appended claims.

BRIEF DESCRIPTION OF THE DRAWING

FIG. 1 is a schematic illustration of the onboard computer system and its inputs and the position display which it drives in a presently preferred embodiment of the apparatus according to the invention.

BRIEF DESCRIPTION OF THE PRESENTLY PREFERRED AND VARIOUS ALTERNATIVE EMBODIMENTS OF THE INVENTION

Throughout this application, the term railway vehicle is used. For a freight train, as used herein, the railway vehicle on which this system would be mounted would most likely be the locomotive. For passenger trains, however, the railway vehicle on which this system would be mounted would most likely be a vehicle carrying the operator of the train.

Reference is now made more particularly to FIG. 1. Illustrated therein is a presently preferred embodiment of a rail navigation system, generally designated 10. This rail navigation system 10 is disposed on a railway vehicle in a train consist. The system 10 includes a computer, generally designated 20. The computer 20 includes a central processor unit 22, a track database, and instructions 25.

A GPS receiver 30 provides a signal over a communication path 32 to an input port 34 of the computer 20. This signal provides relevant information concerning the geographical position of the railway vehicle or another railway vehicle, and it may also supply heading information.

The railway navigation system 10 also includes an odometer 40 which provides a signal over a communication path 42 to an input port 44 of the computer 20. The computer 20 is also equipped to receive turn rate information from a turn rate indicator 50 over communication path 52 and through an input port 54.

In a presently preferred embodiment of the invention, the operator of the railway vehicle may provide additional input to the computer 20 through an operator's input device 60, communication path 62, and input port 64. The operator's input device 60 may, for example, be a computer keyboard or display function keys (not shown) disposed in the cab of a locomotive.

The computer 20 provides a signal from an output port 74 and through a communication path 72 to a position display 70. Position display 70 displays information for the operator of the railway vehicle. The purpose of such position display 70 is to inform the operator of the train as to the exact position of the train consist in relation to the track system.

In the broadest aspect, this invention provides a navigation system 10 for a railway vehicle travelling on a track system. The system 10 uses an on-board computer 20 with a track database 24 representing the locations of the rail lines installed therein. Such track database 24 including the locations of curves and switches disposed in the track system.

The navigation system 10, additionally, uses a turn rate indicator 50 and an odometer 40. The odometer 40 may include a wheel revolution sensing means. The signal originating from the odometer 40 may be differentiated in time to obtain the speed of the railway vehicle. By combining the speed with the turn rate, a value is obtained for the curvature of the track on which the vehicle moves. This curvature data is compared with data in the track database to determine the position of the railway vehicle in relation to curves and switches of the track system. This data may, also, be used to obtain a track identifier for the track on which the railway vehicle is moving.

The navigation system 10 of the present invention may also include a means for detecting and generating a signal which is representative of an event of the railway vehicle passing over regions of a track system having a curvature which alternates from positive to negative or negative to positive. In this embodiment, the navigation system 10 may use this signal as an indication that the railway vehicle has been switched to an adjacent track of the track system. This data may, also, be used to obtain a track identifier for the track on which the railway vehicle is moving, and to communicate this track identifier to an operator display or to a control means for the railway vehicle.

The navigation system 10 may, also, use an odometer 40 for determining the position of the railway vehicle when it is on a straight portion of track remote from curves and switches of the track system, and to generate a signal indicating this position to an operator display and/or to a control means for the railway vehicle.

The navigation system 10 may also have a means, generally designated 60, for enabling a manual input to the on board computer system 20 of a track identifier and position along the track from the operator of the train. Preferably, such means 60 is a keypad on a display unit.

In an additional alternative aspect, the navigation system 10 may include a GPS receiver 30. Such GPS receiver 30 provides the navigation system 10 with a position for the railway vehicle in relation to global coordinates such as latitude and longitude. The GPS receiver 30 may also provide heading information. It is anticipated that the accuracy of this GPS receiver 30 is adequate to identify a curve or switch on which the railway vehicle is located, but it is anticipated that it is not sufficiently accurate by itself to determine on which track of a set of adjacent parallel tracks the vehicle is located. This GPS receiver 30 receives signals from a transmitter on an earth orbiting satellite.

The odometer 40, in a presently preferred embodiment of the invention, may include a wheel revolution sensing means which indicates angular travel of a wheel of the railway vehicle.

Navigation system 10 may further include a means for obtaining a signal which is a calibration signal for the wheel diameter, to make the distance measuring function of the odometer 40 more accurate. This would be accomplished, for example, by establishing two positions on the track, either by GPS receiver reference data, or by obtaining the relation of the railway vehicle to curves or switches disposed in the track system. By comparing the distance between the two positions from the track database to the difference between signals from the odometer 40 at the two positions, it is possible to calibrate the wheel diameter. This is used to compensate for wear of the wheel.

Such navigation system 10 may also include a means for detecting a straight portion of the track system and making the calibration over this straight portion. This is a more desirable location because on a curve, for example, either the left or the right wheel on any axle must slip.

The turn rate indicator 50 will be a gyroscope, in the presently preferred embodiment, and the gyroscope will, preferably, be a solid state gyroscope. Alternatively, turn rate information can also be obtained from the GPS system 30, based upon changes in heading data.

It is of interest to note that although the GPS system, without ground correction, is not accurate enough to determine on which of two adjacent parallel tracks the railway vehicle is located, it is still possible to use heading data of the GPS system to detect the event of the railway vehicle being switched to an adjacent parallel track. This is because switches always cause a significant change in heading of a railway vehicle passing over them.

The navigation system 10, according to the presently preferred embodiment, will include a means for determining that the GPS receiver 30 is not functioning, and in that case, to direct the computer system 20 to make position determinations based on information from the odometer 40 and the turn rate indicator 50 in relation to the track database in such computer system 20. Non functioning of the GPS receiver 30 may occur, for example, during times of excessive radio interference, or when the railway vehicle is passing through a tunnel or under a bridge.

In a further aspect, this invention provides a method of determining a track identifier for a railway vehicle moving on a track system. A computer system 20 is provided on the railway vehicle, and the computer system 20 is provided with signals indicating a track database having information defining both the locations and orientations of curves, switches and track identifiers of the track system. The computer system 20 is, also, preferably provided with a signal representing an approximate position for the railway vehicle. Additionally, the computer system 20 is provided with at least one signal indicating a heading of the railway vehicle. The computer system 20 is further provided with a signal indicating either odometer information or speed.

According to this invention, the computer system 20 is programmed to determine an event of the railway vehicle passing over a switch of the track system based on the approximate position of the railway vehicle and the heading of such railway vehicle. A particular switch of the track system is thereby defined, and from that a track identifier is defined. The approximate position for the railway vehicle which is used by this method may be provided, for example, by a global positioning system.

The method of the invention may further include the step of determining a position of the railway vehicle operating on the track system using signals indicative of odometer information, or signals indicative of speed. Signals indicating position may be updated based on heading information obtained when the railway vehicle is passing over switches or curves located in the track system.

Turning now to the presently most-preferred embodiment, it should be noted that the technologies on which this invention relies are changing rapidly, and future embodiments falling within the spirit and scope of the claims of this invention, may differ considerably from the presently most-preferred embodiment.

At the present time, the computer system 20 could be a ruggedized computer using microprocessors such as a "486" or an Intel Pentium. The track database 24 and the instructions 25 could be input through a floppy disk drive, a serial port, a high speed modem, etc. The position display 70 could be a ruggedized display monitor such as a cathode ray tube, a liquid crystal display or light-emitting diode display, etc.

The computer and display may either be dedicated to the present system, or may be used for other systems as well. Generally, the computer would periodically run some of the instructions for the present system whenever the train is moving, to keep track of the train's position.

It is not necessary for the global positioning system to use differential correction which requires a communication link between a ground station at a fixed location, and the train. The apparatus and methods of this invention make it possible to define track I.D.'s and train positions without requiring differential correction of the position coordinates obtained from the global positioning system.

It is preferred that the GPS system 30 supply position coordinates such as latitude and longitude, and also supply data representing speed and heading of the locomotive. Present global positioning systems are able to supply speed and heading data for a moving vehicle based on a Doppler shift measurement which is independent of "selective availability" position error factors in the satellite signals.

The preferred embodiment of the invention also employs a turn rate indicator 50 which may be a gyroscope which has an axis sensitive to turns in the horizontal direction. A solid state gyroscope may also be used.

It is preferred that the computer system 20 receive as inputs thereto both the heading information from the global positioning system and the turn rate information. Such computer system 20 should set values for variables which represent heading information and turn rate information and which are accessible by other routines of this system. If the time rate of change of heading, calculated by the computer system 20, is inconsistent with turn rate information, an indication should be sent to the operator of the train.

The odometer 40, in present art, is a device which generates pulses, a known number for each revolution of a wheel of the train. From this information, the computer system 20 can calculate the distance travelled by multiplying the number of pulses counted by a calibration parameter. The calibration parameter depends on the diameter of the wheel. The computer system 20 should initially have an initial value for the calibration parameter.

The computer system 20 may have routines for identifying a straight portion of the track system, and, in the event that a brake application is not required on that portion of the track, obtain the calibration parameter from a knowledge of train location at two occasions and pulse count at those occasions. It is desirable to have a means for setting equal to zero a parameter in the computer system 20 which represents distance travelled at some place on the track system. This may be the place from which milepost data are calculated.

It is desirable for the computer system 20 to calculate a value for the speed of the train as it moves along the track. This may be obtained reciprocally from the time between two pulses of the odometer 40, for example.

Means 60 should be provided for the operator of the train to provide input of information into the computer system 20. Such means 60 may include a ruggedized computer keyboard. The program should provide an occasion at the beginning of a run for the operator to make inputs. These inputs may include track I.D. and milepost information. The program should also provide a method for the operator to optionally make inputs of such quantities to the computer system 20 when the train is moving.

It is presently preferred that routines be provided in the computer system 20 to compare both the values of variables representing heading and values of variables representing turn rate with the track database and presently-known position. For example, track curvature can be obtained from turn rate information and the velocity of the train. This should be matched by the computer system 20 to curvature information of curves and switches in the track database. Likewise, the value of a variable indicating heading can be compared with heading information in the track database.

The value of a variable representing position may be updated based on small inconsistencies between heading or curvature signals, and information in the track database. If the computer system 20 cannot make a match between the heading or curvature signals for that portion of the track database near its calculated position, then a signal should be sent to the operator of the train.

The computer system 20 should be programmed so that if an outage of the radio navigation system occurs, values can still be obtained for position, based on turn indications for defining position relative to curves and switches of the track system, and odometer 40 information for obtaining a position at locations remote from curves and switches.

Signals representing the position of the train consist in relation to a track database may be used in the system of the copending application cited above, which relates to the control of brakes. Such signals may also be used in a positive train separation system, or in a future train-handling system in which a computer operates the train under the supervision of the engineer.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

We claim:

1. A navigation system for a railway vehicle travelling on a track system, said navigation system comprising:
   (a) a storage device for storing a database including data pertaining to locations of railway track routes and locations and orientations of switches and curves in such railway track routes of such track system;
   (b) a rate of turn measuring apparatus for measuring a rate at which such railway vehicle turns on such railway track so as to generate a signal indicative of a turn rate of such railway vehicle;
   (c) a speed sensing device for sensing rotation of a wheel of such railway vehicle so as to generate a signal indicative of at least one of speed of and distance traveled by such railway vehicle;
   (d) a computing device
   for deriving a signal indicative of curvature of such railway track on which such railway vehicle is travelling from said signal indicative of turn rate and said signal indicative of at least one of speed and distance and for comparing said signal indicative of curvature with said data pertaining to said locations and orientations of switches and curves in such track system to determine more accurately said position such railway vehicle occupies in relation to a particular one of such curves and such switches in said database and to generate a position signal indicative thereof; and
   (e) a means for using said position signal for at least one of an operator display, an input to a control means of such railway vehicle, and as a signal for computations in said computing device.

2. A navigation system, according to claim 1, wherein a computer preexisting on such railway vehicle serves as said computing device to enable said preexisting computer to perform the functions attributed to said computing device.

3. A navigation system, according to claim 1, wherein:
   (a) said database further includes data pertaining to a track identifier for each such railway track in such track system; and
   (b) said computing device uses said signals along with and in comparison to said data to determine when such railway vehicle traverses one of such switches of such track system so as to identify the particular such track identifier that corresponds to such railway track on which such railway vehicle is travelling.

4. A navigation system, according to claim 3, wherein said navigation system further includes a means for entering input into said navigation system, said input including at least one of current position that such railway vehicle occupies on such railway track and such track identifier corresponding thereto.

5. A navigation system, according to claim 4, wherein said navigation system further includes a means for sounding an alarm in the event that said current position entered manually and said position calculated by said computing device are inconsistent.

6. A navigation system, according to claim 1, wherein said computing device uses at least said signal from said navigational receiver to determine at least one of:
   (a) a heading of such railway vehicle on such railway track;
   (b) said speed of and distance traveled by such railway vehicle; and
   (c) said rate at which such railway vehicle turns on such railway track.

7. A navigation system, according to claim 1, wherein said computing device uses at least said signal from said navigational receiver to determine also speed of and distance traveled by such railway vehicle absent braking thereof on a straight section of such railway track with which to calibrate diameter of such wheel of such railway vehicle for purpose of maintaining accuracy of said speed sensing device.

8. A navigation system for a railway vehicle travelling on a track system, said navigation system comprising:
   (a) radio navigation first means for generating a first signal indicative of a first position of such railway vehicle;
   (b) a database disposed in a computer system within such railway vehicle for providing a set of second signals indicative of a geographical disposition of switches and curves of such track system;
   (c) second means disposed on such railway vehicle for communicating a third signal indicative of a turn rate of such railway vehicle to such computer system;
   (d) third means disposed on such railway vehicle for communicating a fourth signal indicative of a speed of such railway vehicle to such computer system;
   (e) a set of fifth signals disposed within said computer to provide instructions for generating a sixth signal based on said third signal and said fourth signal, said sixth signal indicative of a curvature of at least one of a curve and a switch on which such railway vehicle is moving;
   (f) said computer system having means for using said first signal to select a first portion of said set of second signals representing a portion of such track system in a vicinity of said first position, and comparing said sixth signal with said first portion of said set of second signals to generate a seventh signal indicative of a second position of such railway vehicle in relation to said database at a time when such railway vehicle is traversing at least one of a curve and a switch;
   said second position indicated by said seventh signal being more accurate than said first position indicated by said first signal; and
   said computer system having means for using said seventh signal for at least one of an operator display, input to a control means of said railway vehicle, and a signal for computations in said computer system.

9. A navigation system, according to claim 8, wherein said navigation system further includes said computer system.

10. A navigation system, according to claim 8, wherein said second means includes a turn indicator.

11. A navigation system, according to claim 10, wherein said turn indicator means includes a gyroscope.

12. A navigation system, according to claim 11, wherein said gyroscope is a solid state gyroscope.

13. A navigation system, according to claim 8, wherein said third means includes a wheel revolution sensing means.

14. A navigation system, according to claim 13, wherein said navigation system further includes:

means connected to said computer for at least one of generating and receiving from said wheel revolution sensing means an eighth signal indicative of distance travelled of such railway vehicle;

means disposed in said computer system for determining a ninth signal based on said sixth signal obtained when passing over one of a switch and a curve of such track system, and said eighth signal;

said ninth signal indicative of a third position of such railway vehicle at points on such track system remote from curves and switches of such track system;

said computer system having means for using said ninth signal for at least one of an operator display, input to a control means of such railway vehicle, and a signal for computations in said computer system.

15. A navigation system, according to claim 14, wherein said navigation system further includes means for generating a signal indicative of a calibration representative of wheel diameter based on said eighth signal and on at least two positions obtained from at least one of said radio navigation means and curves and switches of such track, said calibration being used in subsequent determinations of said eighth signal.

16. A navigation system, according to claim 15, wherein said navigation system includes means for detecting a straight portion of track and to obtain said calibration when such railway vehicle is travelling on such straight portion of track without braking.

17. A navigation system, according to claim 8, wherein said radio navigation means includes a receiver on such vehicle, said receiver for receiving signals from a transmitter on an earth orbiting satellite.

18. A navigation system, according to claim 17, wherein said radio navigation means is a global positioning system.

19. A navigation system, according to claim 8, wherein said navigation system further includes means to generate an eighth signal indicative of non-functioning of said radio navigation means to direct said computer to generate a ninth signal indicative of a best known position of such railway vehicle based on an earlier value for said first signal, and an earlier value of said seventh signal, and means to update said ninth signal based on said sixth signal and said set of second signals, at least one time when such railway vehicle is traversing one of a curve and a switch of such track system.

20. A method of determining a track identifier for a railway vehicle moving on a track in a track system, said method comprising:

(a) providing a computer disposed on said railway vehicle;

(b) providing said computer with signals indicative of a track database having information defining locations and orientations of curves, switches and track identifiers of said track system;

(c) providing said computer with at least one signal representative of an approximate position for said railway vehicle;

(d) providing said computer with at least one signal indicative of a time changing heading of said railway vehicle;

(e) providing said computer with at least one signal indicative of at least one of odometer reading and speed of said railway vehicle;

(f) providing said computer with signals indicative of instructions for determining an event of said railway vehicle passing over a switch of said track system based on said at least one signal representative of an approximate position of said railway vehicle and said at least one signal indicative of a time changing heading of said railway vehicle to generate a signal indicative of a particular switch on said track database and thereby generate a signal indicative of a track identifier for said railway vehicle; and (g) providing said signal indicative of said track identifier to at least one of an operator display and a train control system.

21. The method, of claim 20, wherein said step (c) of providing an approximate position for said railway vehicle includes using a global positioning system.

22. The method, of claim 21, wherein the method includes the additional steps of:

(a) providing said computer with signals indicative of instructions to generate signals indicative of position on said track using one of signals indicative of odometer information and signals indicative of speed;

(b) updating said signals indicative of position on said track based on said at least one signal indicative of time changing heading and said signals indicative of curves and said signals indicative of switches of said track system.

* * * * *